US005728449A

United States Patent [19]

Steininger et al.

[11] Patent Number: 5,728,449

[45] Date of Patent: Mar. 17, 1998

[54] ANTI-COPY FILM LAYER FOR DOCUMENTS

[75] Inventors: Helmut Steininger, Worms; Peter Heilmann, Bad Duerkheim, both of Germany; Peter Hewkin, Cambridge, Great Britain

[73] Assignee: EMTEC Magnetics GmbH, Ludwigshafen, Germany

[21] Appl. No.: 381,917

[22] PCT Filed: Jul. 18, 1993

[86] PCT No.: PCT/EP93/01891

§ 371 Date: Feb. 13, 1995

§ 102(e) Date: Feb. 13, 1995

[87] PCT Pub. No.: WO94/04367

PCT Pub. Date: Mar. 3, 1994

[30] Foreign Application Priority Data

Aug. 14, 1992 [DE] Germany .......................... 42 26 906.7

[51] Int. Cl.$^{6}$ .......................... B32B 3/00

[52] U.S. Cl. .......................... 428/195; 428/29; 428/198; 428/203; 428/411.1; 428/488.4; 428/913; 428/914; 283/72; 283/100; 283/107

[58] Field of Search .......................... 428/195, 202, 428/205, 212, 913, 914, 411.1, 29, 198, 203, 488.4; 430/904, 346; 283/72, 100, 107

[56] References Cited

U.S. PATENT DOCUMENTS

| | | | |
|---|---|---|---|
| 3,887,742 | 6/1975 | Reinnagel et al. | 428/211 |
| 4,025,673 | 5/1977 | Reinnagel et al. | 428/29 |
| 4,184,700 | 1/1980 | Greenaway | 283/6 |

FOREIGN PATENT DOCUMENTS

| | | |
|---|---|---|
| 610614 | 6/1989 | Australia . |
| 8601250 | 12/1987 | Netherlands . |

*Primary Examiner*—William Krynski
*Attorney, Agent, or Firm*—Keil & Weinkauf

[57] ABSTRACT

An anti-copy film or layer for originals or documents comprises according to the invention transparent film material having a multiplicity of at least partially opaque and possibly reflective areas arranged at distances from one another which are arranged as screens on the film surfaces essentially in horizontal planes, in particular parallel to one another, but offset, so that information on an original lying under this film or layer is masked in an approximately vertical viewing direction and is visible in the direction of a predefined viewing angle. Expedient production methods enable the use of photographic techniques.

27 Claims, 7 Drawing Sheets

ANTI-COPY FILM LAYER FOR DOCUMENTS

The present invention relates to an anti-copy film or layer for documents, comprising a film or layer of transparent material having a multiplicity of at least partially opaque areas, arranged at distances from one another and whose planes are arranged in approximately the same predefined position relative to the surfaces of the film or layer, so that the anti-copy film is essentially opaque at a viewing angle approximately perpendicular to the surfaces of the film or layer and is essentially transparent from a predefined viewing angle to the surfaces of the film or layer.

An anti-copy film of the abovementioned type is described in U.S. Pat. No. 3,887,742. A film of this type, which is intended to make copyproof documents possible, is effective in masking graphic information and/or symbols on a document or, generally, a paper in the vertical viewing direction, as in a photocopier, and rendering the graphic information and/or symbols visible at a predefined other viewing angle, relative to the plane of the document.

In practical terms, an anti-copy film of this type is a transparent plastic film containing opaque areas or having a surface which is notched in any desired manner or has a sawtooth profile in cross-section, in which a first inclined or perpendicular surface is either black or reflective with respect to a perpendicular viewing angle, relative to the plane of the film or document, and the other inclined surface is transparent at another viewing angle, so that the information or symbols are readable. Notched or sawtooth-profile sufaces of this type are extremely difficult to produce, since firstly the surfaces must be embossed or impressed, and then the inclined areas must be provided with a black or reflective material, it being necessary for the accuracy of these operations to be so high that the transparent areas are not affected, ie. are not also partly provided with black or reflective material. For the theoretical formation of inclined surfaces within the film, practical production details are not given.

An anti-copy medium for a written or printed material is disclosed in Australian Patent Application No. 610,614, in which the medium contains a photosensitive colorant system which renders the writing illegible on irradiation in a photocopier or makes the copy clearly differentiable from the original, so that either the original becomes worthless or becomes clearly recognisable as having been copied.

It is an object of the present invention to provide an anti-copy film or layer which is simpler to produce and is more economical.

We have found that this object is achieved by an anti-copy film or layer for documents, comprising a film or layer of transparent material having a multiplicity of at least partially opaque areas, arranged at distances from one another and whose planes are arranged in approximately the same predefined position relative to the surfaces of the film or layer, so that the anti-copy film or layer is essentially opaque at a viewing angle approximately perpendicular to the surfaces of the film or layer and the anti-copy film or layer is essentially transparent at a predefined viewing angle to the surfaces of the film or layer, wherein each of these at least partially opaque areas is formed from at least first opaque screens on one of the surfaces of the film or layer and at least second opaque screens on the remaining surfaces of the film or layer, and wherein the at least first and second screens are arranged essentially horizontally.

This significantly simplifies production of a film or layer of this type, which would otherwise have to be produced mechanically and/or chemically, and allows significant variations, depending on the intended use.

In practice, the first and second screens may be arranged parallel to one another, but offset, in horizontal planes.

In an expedient embodiment, the first and second screens can have the same width (in cross-section) and be arranged in a staggered, but substantially non-overlapping, manner.

However, it is also possible for the first and second screens to have approximately the same width and to be arranged in a staggered and overlapping manner. It may also be expedient to design the first and second screens with different widths.

In practice, the screens can be applied as a line structure to both sides of a transparent film or layer, in particular by printing.

This is a very favourable production method for the mass production of such films and layers.

In practical terms, a novel film of this type has the features that a first photosensitive coating has been applied to one side of a transparent film, exposed directly and developed, and a second photosensitive coating has then been applied to the other side of the transparent film, exposed directly and developed.

In a further practical embodiment, a first photosensitive coating has been applied to one side of a transparent film, exposed directly and developed, and a second photosensitive coating has then been applied to the other side of the transparent film, exposed indirectly through the first developed photosensitive coating and the film, and developed.

In a further variant, a line structure has been applied to one side and a photosensitive coating to the other side of a transparent film, and the photosensitive coating has been exposed through the line structure and developed.

This exposure may take place by means of parallel or divergent radiation, so that either, to an approximation, there is no overlapping of the screens or marginal overlapping.

In an advantageous embodiment, a negative resist coating has been applied to one side and a positive resist coating to the other side of a transparent film, and two coatings are formed by exposure through a line structure mask from the negative resist coating side and by washing out the two coatings.

The photosensitive coating material may expediently be a photographic emulsion or alternatively a plastic coating containing photoinitiators.

It is also advantageous if a non-opaque coating material is rendered opaque before application, in particular by admixing a colorant.

A non-opaque coating material can be provided with opaque material, for example colorants, at the raised or indented areas after application, exposure and development.

The finished coating containing the screens may also be sealed against damage by means of a transparent coat of lacquer.

Further patent claims relate to a multifilm or multilayer embodiment of the anti-copy film according to the invention and to advantageous ranges for the dimensions of the screens, the film or the layer and of an optional base film, in order to achieve substantially ideal screening and transparency ratios. In particular, the screens, which are at least in part opaque and/or reflective, can be essentially in the form of stripes and can be arranged approximately parallel to and at equal distances from one another.

BRIEF DESCRIPTION OF THE DRAWINGS

The invention is described below in individual embodiments with reference to drawings, in which.

DEFINITIONS

Screens

In the context of the present invention, these screens provide optical screening. In the extreme case, a very thin coating which is opaque to light and may also be reflective is sufficient for this purpose. The coating thickness can be up to the film or layer thickness without problems.

Exposure

This can take place through optical masks placed on (and in contact with) the coating to be exposed.

Exposure may also take place without contact by means of a scanner or using a plurality of light sources (for example photodiode array), it also being possible for the plurality of light sources to be generated optically, for example by diffraction gratings.

Liqht source

Is any device which emits radiation.

Radiation is produced by any electromagnetic source, including corpuscular radiation (for example electron beams)

Development

Chemical development for photographic coatings and curing by radiation and/or washing out by means of a suitable solvent or water in the case of photosensitive plastics with or without a contents of color.

DESCRIPTION OF THE DRAWINGS

Figure 1A:
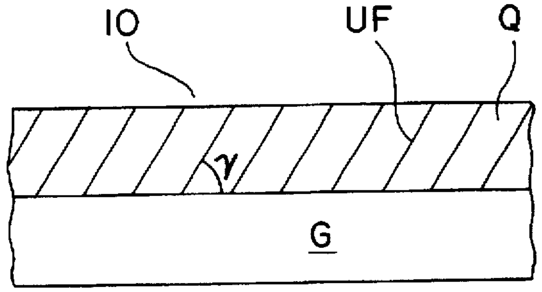
FIG. 1, *a* and *b* shows embodiments of copyproofing films from the prior art with inclined areas, FIG. 2, *a* and *b* shows anti-copy films according to the invention containing screens.

FIG. 1*a* shows a known theoretical copyproofing film, comprising a thin transparent plastic material Q on a transparent base material G, the material Q containing a number of parallel, equally spaced, opaque, inclined planes in an angle range from γ=50° to 70°, preferably 60°, to the surface of the material Q. The planes should be black or reflective. The copyproofing film can be applied to the original to be protected by adhesive bonding or by other types of adhesion. The inclined opaque planes should be about 2.5 μm thick and arranged at a spacing of 25 μm. The production of a theoretical copyproofing film of this type is not described.

Figure 1B:
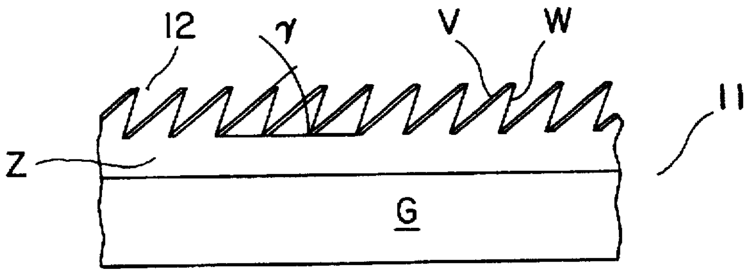

FIG. 1*b* shows a copyproofing film 11 described in the same U.S. Pat. No. 3,887,742, having a plastic material Z which has a sawtooth-profile surface 12 which likewise comprises transparent plastic. In this case, the inclined tooth flanks V (see bolder lines) should be black or reflective, while the vertical flanks W are transparent.

As in the above example, the information on the original is obliterated or masked in the vertical viewing or copying direction and is rendered visible in the inclined viewing direction (angle range γ as indicated above).

Figure 2A:
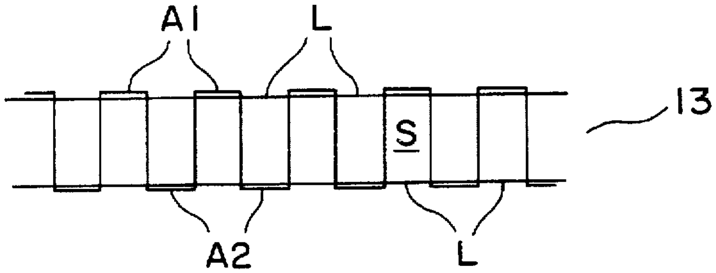
Figure 2B:
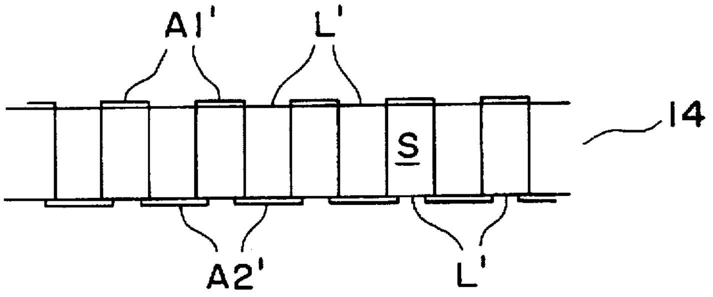

Embodiments of the present invention are represented diagrammatically in the FIGS. 2*a* and 2*b*.

In contrast to the known copyproofing films in FIGS. 1*a* and 1*b*, in which, without exceptions, inclined planes or areas are utilised as the optical masking means, the present invention follows the following route.

These anti-copy films or layers comprise a transparent film or a transparent layer S (only a film S is referred to hereinafter), which is provided with screens A which are approximately parallel and are in the form of stripes and have been applied to the top (A1) and bottom (A2) surfaces of the film with gaps L between them and are intended to serve as optical screens under defined (approximately perpendicular) viewing angles and as optical openings under other viewing angles of approximately 30°–73°, in particular from about 45° to about 60°.

The screens A1 and A2 are arranged essentially horizontally, which means that although slight deviations from the horizontal plane have no adverse effect, they are not necessary for the purposes of the invention, as, for example, in the inclined plane arrangement in FIGS. 1*a* and 1*b*.

The screens A1 and A2 have identical or different dimensions, as is evident from a comparison of the FIGS. 2*a* and 2 *b*. In FIG. 2*a*, essentially identical widths of A1 and A2 are used at the top and bottom, while in FIG. 2*b*, the widths of the screens A2' are greater than those of the screens A1'.

Figure 8:
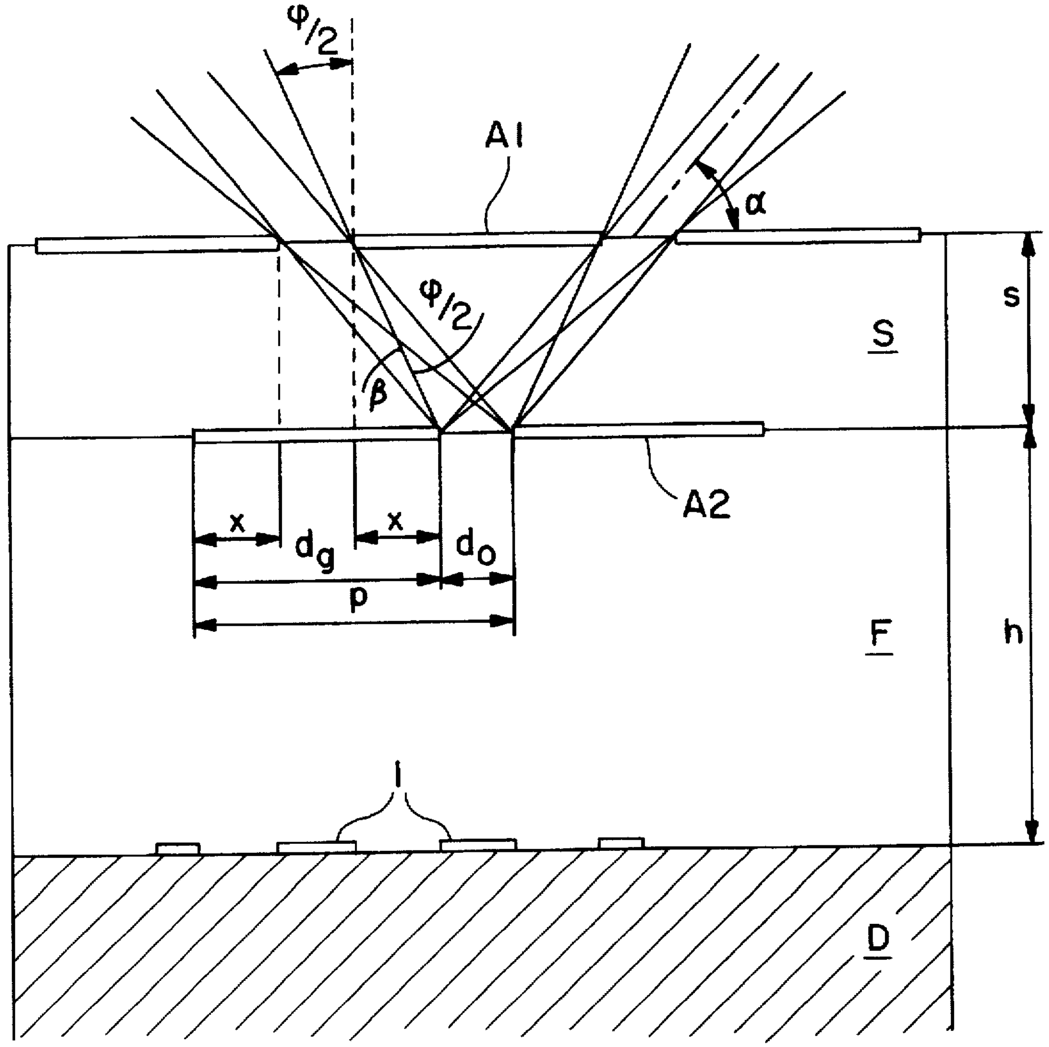
FIGS. 8 and 9 show diagrammatically geometrical representations of an anti-copy film or anti-copy layer according to the invention.
Figure 9:
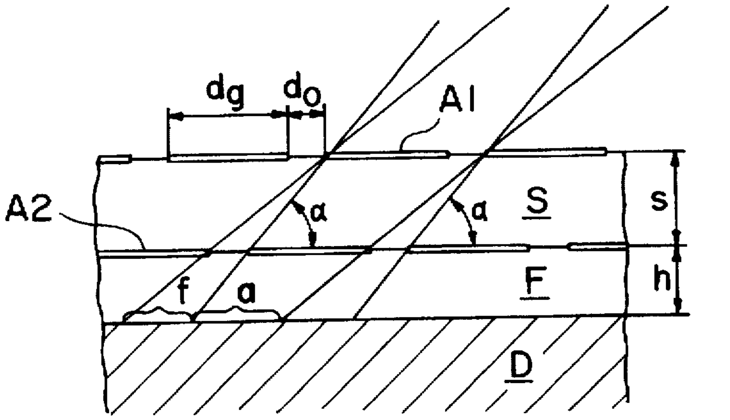

The geometrical considerations necessary for practical use of such films with screens are explained below with reference to the diagrammatic sketches in FIGS. 8 and 9.

φ: effective aperture angle of conventional commercial photocopiers $6° \leqq \phi/2 \leqq 54°$ dg: width of the screens A1 and A2 do: width of the gap L between the screens s: thickness of the film S h: thickness of any base film F x: overlap width of the screens A1 and A2 p: sum of the widths dg and do

α: mean viewing angle for reading

T: transmission of the arrangement $$T = \frac{do}{dg + do}$$

The geometry of the sketch (FIG. 8) gives the following:

$$\tan \phi 2 = x/s = Y,$$

and a mean viewing angle α=45° gives the following:

$$dg + do = 2s$$

$$do = 2s - dg$$

$$dg = s + x$$

$$dg > s \text{ if } \alpha > 45°$$

For A=1/tan α and A>Y, $$dg = s(A + Y)$$

$$do = s(A - Y)$$

and for the transmission, it follows that $$T = \frac{do}{dg+do} = 1/2(A-Y).$$

For the angle range $6° \leqq \phi/2 \leqq 54°$, the system parameter inequality $$0.05 \leqq Y \leqq 0.5$$

is obtained.

If the angle range is limited to $6° \leqq \phi/2 \leqq 12°$, $$0.05 \leqq Y \leqq 0.1.$$

For the viewing angle range, it is assumed that $$A = 1/\tan\alpha \text{ and } 73° \leqq \alpha \leqq 30.5°.$$

It follows that:

$$0.3 \leqq A \leqq 1.7.$$

The film thickness s is in the large range from about 5 to about 300 μm, in particular from about 20 to 100 μm. For this calculation example, the film thickness s is in practice in the range from $$5\ \mu m \leqq s \leqq 100\ \mu m$$

This gives the following ranges for do and dg:

| s | α | 5 μm | 50 μm | 100 μm |
|---|---|---|---|---|
| do | 73° | 1.0 μm–1.25 μm | 10 μm–12.5 μm | 20 μm–25 μm |
| | 30° | 8.0 μm–8.25 μm | 80 μm–82.5 μm | 160 μm–165 μm |
| dg | 73° | 1.75 μm–2.0 μm | 17.5 μm–29.9 μm | 35.0 μm–40.0 μm |
| | 30° | 8.75 μm–9.0 μm | 88.75 μm–90.0 μm | 175 μm–180 μm |
| h min | 73° | 4.85 μm–4.95 μm | 48.5 μm–49.5 μm | 97 μm–99 μm |
| | 30° | 3.8 μm–3.95 μm | 38 μm–38.5 μm | 76 μm–77 μm |

The values of do and dg show the considerable effect of viewing angle α on the dimensioning.

If a base film F is used, the longer path (h) followed by the light rays means that it must also be taken into account that, in addition to the visible area, an invisible area a which is "optically masked" by the screens A1 and A2 themselves exists on the document D.

This gives the following relationship:

$$h = 2s - a \text{ or } 2 - y$$

$$a = 2s - h(2-y)$$

$$\text{for } h(2-y) >> 2s$$

$$a \to 0.$$

If h is increased, a approaches 0, which is the aim.

It has been found that the maximum value for a is $$a \leqq 0.3dg.$$

This gives a very small invisible area a. For clarification, the value of h min has been included in the above table, the different values also showing the significant effect of A or α on h min.

In the above calculation, the thickness of the screens, which could further increase the value a, have been neglected.

The following is an illustrative procedure for the production of the anti-copy films or anti-copy layers according to the invention.

The anti-copy films 13 and 14 can be produced on one side or both sides simultaneously by printing using any suitable printing method with the parallel line structures (screens) A1, L; A2, L or A1', L' and A2', L'. Precise positioning of the screens A1 or A1' with respect to their pendants A2 or A2' is required and depends on the respective predefined viewing angle α.

The thickness of the printed coatings is in the order of less than 1 μm, so that the above fear of obtaining enlarged invisible areas a is groundless.

Figure 3:
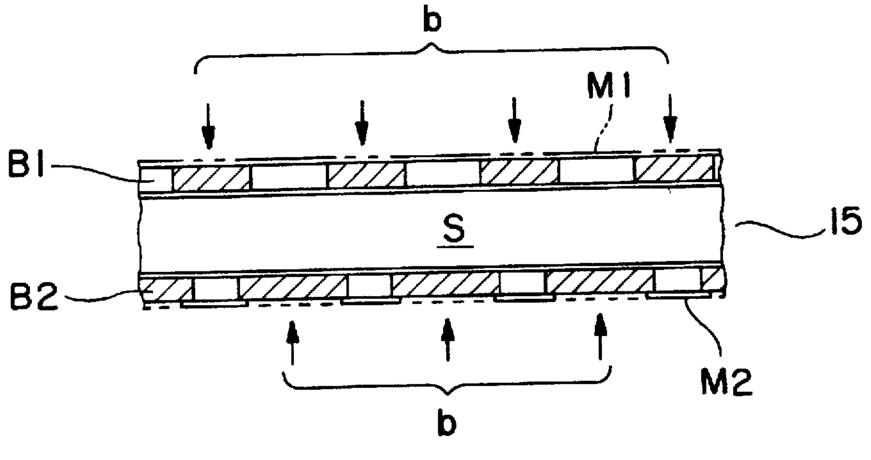
FIG. 3 shows screens according to the invention, produced by photosensitive coatings on both sides.

In FIG. 3, the parallel line structures A1, L; A2, L or A1', L' and A2', L' are produced photographically by application of photosensitive coatings B1 or B2 successively to both sides of the film S.

Firstly, the coating B1, for example, is applied using a suitable method, for example by lamination, spraying etc., then exposed through a mask M1 and developed in a suitable manner.

The coating B2 is then applied, exposed through M2 (which corresponds to M1 and may also be M1) and then developed. The exposure of the coating B2 may also expediently take place through the coating B1 which has already been exposed and developed. The mask M2 would then be superfluous.

The exposure is carried out using suitable light sources and is symbolised by the arrows b.

Figure 4:
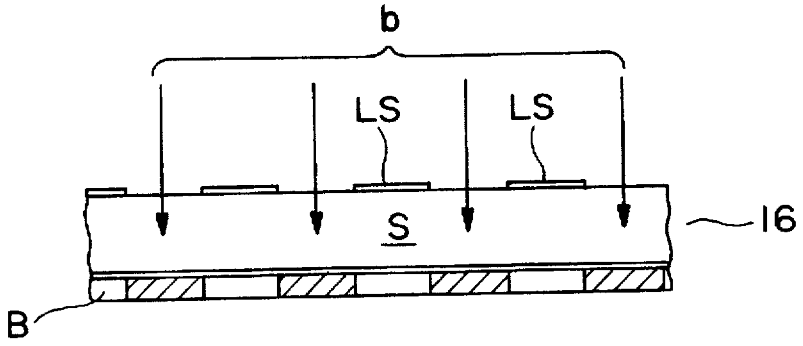
FIG. 4 shows screens according to the invention, formed by exposure of a photosensitive coating through a printed mask, FIG. 5, *a–c* shows diagrammatically the production of screens according to the invention by means of negative resist material, FIG. 6, *a–c* shows diagrammatically the production as in FIG. 5, *a–c*, but by means of positive resist material, FIG. 7, *a* and *b* shows diagrammatically the production of novel screens on both sides by the simultaneous use of negative and positive resist materials.

FIG. 4 shows a variant of the production of the anti-copy film 15 in FIG. 3 with reference to the ant-icopy film 16. Firstly, the line structure LS is applied to one side of the film S by printing. The photosensitive coating B is then exposed through the printed line structure, which then adopts the function of a mask. Depending on the desired overlap between the masks A1 and A2, exposure is carried out using parallel light radiation (collimated light) or divergent light. Parallel light gives a staggered, but substantially non-overlapping arrangement of the screens A1 and A2 (FIG. 2*a*), and divergent light gives an essential overlapping arrangement, as, for example, in FIG. 2*b*.

Figure 5A:
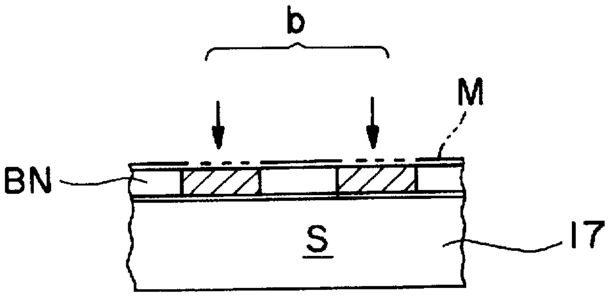
Figure 5B:
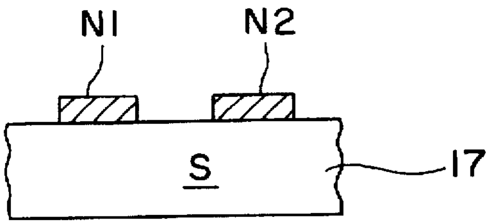
Figure 5C:
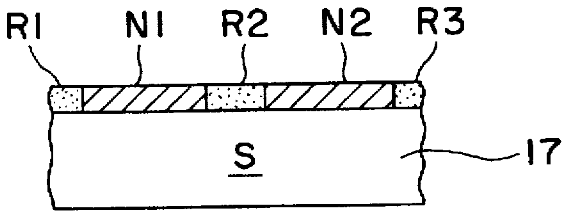
Figure 6A:
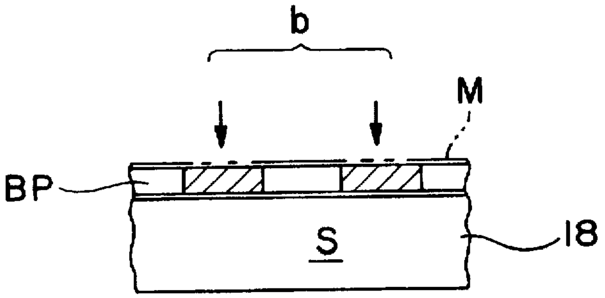

FIG. 5 shows an anti-copy film 17 having a photosensitive coating BN, and FIG. 6 shows an anti-copy film 18 having a photosensitive coating BP.

BN denotes negative photoresist material and BP denotes positive photoresist material.

These materials differ functionally in that the negative resist cures in the exposed areas and the positive resist becomes more soluble, ie. can be washed out, in the exposed areas.

Negative-working photoresists are generally based on photopolymerizable mixtures containing a photopolymerizable compound and a photoinitiator in addition to a polymeric binder. Mixtures of this type contain, for example, partially cyclized polyisoprene as the polymerizable compound and a diazide compound as the photosensitive difunctional crosslinking agent (photoinitiator). It is also known to use partially cyclized polybutadiene as the polymerizable compound together with diazides (see above).

Positive-working photoresists are conventional systems comprising a photoinsensitive alkali-soluble matrix based on novolaks and a photosensitive component which acts as a solubility inhibitor and is converted by exposure into alkali-soluble products, so that all the exposed areas become soluble in the alkaline development solvent.

Other examples of resist for the short-wave UV region are polymethyl methacrylate, copolymers of methyl methacrylate and indenone and of methyl methacrylate and 3-oximino-2-butanone as photoactive component. Also known are two-component systems comprising a methyl methacrylate-methacrylic acid copolymer matrix and o-nitrobenzyl esters, for example esters of cholic acid, as solubility inhibitors.

For the purposes of the present invention, suitable photoresist materials may be selected, and are advantageous, for use with suitable transparent adhesives.

In FIG. 5, after exposure to radiation (arrows b) through a mask M and after development of the negative resist coating BM, the parts M1 and M2 remain as cured parts which form the screens (FIG. 5*b*).

Figure 6B:
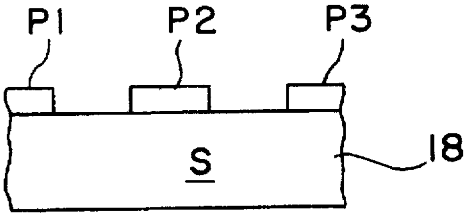

In FIG. 6, after exposure to radiation (arrows b) through a mask M and subsequent development, the unexposed parts P1, P2 and P3 of the coating BP remain and form the screens (FIG. 6*b*).

Figure 6C:
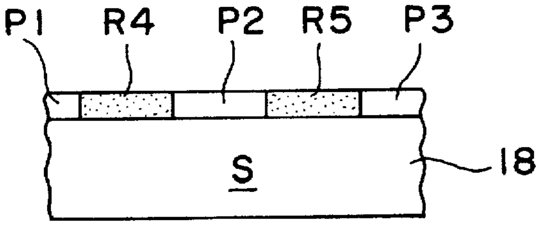

If in these two cases the materials of the resist coatings BN and BP are non-opaque, the washed-out interstices R1–R3 in FIG. 5*c* and R4–R5 in FIG. 6*c* are filled with opaque material, for example colored pigments or the like, in a suitable manner so that in this case the screens are produced by means of the interstices R1–R5. However, the resist material in these cases must be transparent.

Figure 7A:
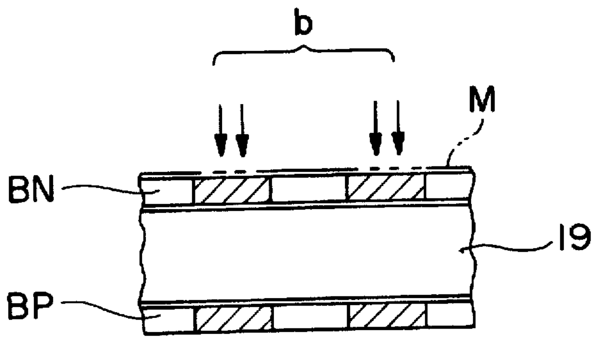

FIG. 7 shows a further method for the production of an anti-copy film 19 in which the upper coating is a negative resist coating and the lower coating is a positive resist coating BP.

Figure 7B:
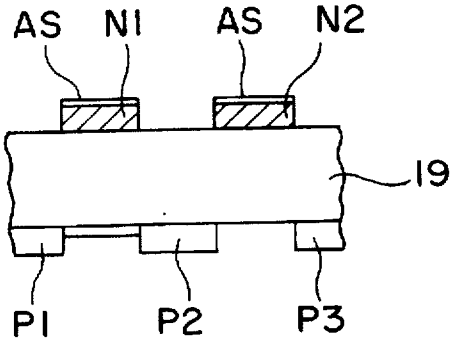

After exposure of the coating BN and development, after which the cured parts N1 and N2 remain, exposure is again carried out from above (arrows b) through the finished upper coating, which serves as a mask for the lower coating BP during the exposure process so that after development the parts P1–P3 remain. In this case, either the negative resist material of the coating BN must be opaque or become opaque through exposure and washing out, or a mask M must be used or the parts N1 and N2 must be colored to give an opaque effect before the second exposure by means of a screening coating AS, as indicated in FIG. 7*b*.

Depending on the method used, either the raised parts N1, N2 and P1–P3 must be colored to give an opaque material or the interstices, as described in FIGS. 5*c* and 6*c* must be rendered opaque if the parts N1, N2 and P1–P3 are transparent.

It is also possible in all cases in FIGS. 2 to 7, after production of the anti-copy films, to coat the finished screening coatings with a preferably transparent protective lacquer.

The photosensitive coatings are applied to the film S in a conventional manner. It is known, for example, to apply very thin coatings by adsorptive or adhesive methods.

In general, it can be assumed that the photographically or photopolymerically produced coatings have a thickness in the range from about 0.1 to about 10 μm or only slightly more.

In order to bond the anti-copy films described to the documents or originals in general or to copies, commercially available adhesives can likewise be used.

In principle, it is naturally also possible to use electrostatic or adhesive sources to apply the films.

Figure 10:
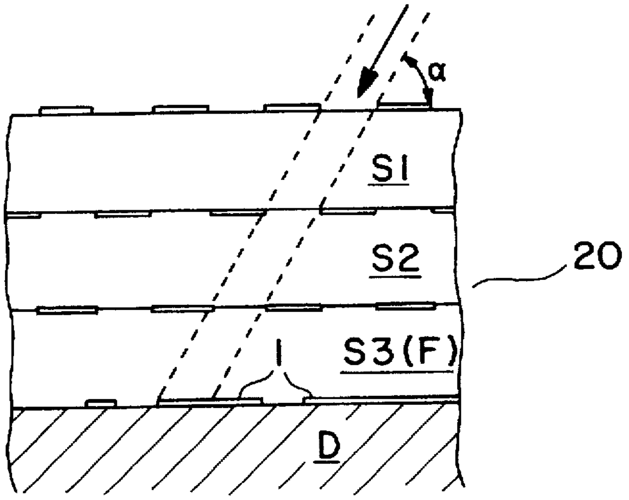
FIG. 10 shows a multifilm embodiment of the anti-copy film according to the invention.

FIG. 10 shows a further variant of the anti-copy films according to the invention, which are distinguished by a multilayer arrangement of individual films or layers.

As shown, three individual films or layers S1–S3, each of which only has the screens A on one side at the top, are transparently bonded to one another.

However, it is also possible for two individual films or layers S1 and S2 to be transparently bonded to one another and to a base film F. In this case, the films or layers S1 and S2 would be designed differently in as much as the film or layer Sl or S2 would have to be provided with screens A on both sides and the other film or layer S2 only with screens A (bottom) or S1 only with sreens A (top). Multilayer arrangements are also feasible.

The physical transparency is defined as the ratio between the transmitted amount of light J and the incident amount of light $J_o$ $$T_{Ph}=\frac{J}{J_o}.$$

The opacity is the reciprocal thereof $$O_{Ph}=\frac{J_o}{J}.$$

The materials referred to herein as being "transparent", such as films, layers or adhesive layers, should come very close to the theoretical maximum value for the transparency $T_{ph}$~1, and the opacity $O_{ph}$ of the screen materials referred to as being "opaque" should be as large as possible. A large amount of light scattering or light reflection by the material intended to act as a screen may, in the context of the present invention, be as advantageous as a material of high opacity if the ratio between the incident amount of light $J_o$ is very much greater than the transmitted amount of light, ie. if $J_o >> J$.

Terms used herein such as at least "partially non-transparent or opaque areas" are thus to be regarded as partially opaque or partially light-reflecting in the sense that a light from a photocopier only passes through the anti-copy film or layer to the original in an amount which is too low for the copying process. Likewise, the term "essentially transparent" should be understood, again in the sense of physical transparency, as having very high transparency to light.

An anti-copy film or layer for originals or documents comprises according to the invention transparent film or layer material having a multiplicity of at least partially opaque and possibly reflective areas arranged at distances from one another which are arranged as screens on the film surfaces essentially in horizontal planes, in particular parallel to one another, but offset, so that information on an original lying under this film or layer is masked in an approximately vertical viewing direction and is visible in the direction of a predefined viewing angle. Expedient production methods enable the use of photographic techniques.

We claim:

1. An anti-copy film or layer (S) for documents which prevents copying the documents in a copying apparatus with a given effective optical aperture angle, comprising:

at least one film or at least one layer of transparent material having two surfaces and a multiplicity of at least partially opaque areas, wherein the opaque areas are formed as opaque screens and arranged at distances from one another and in a position relative to the surfaces of the film(s) or layer(s) (S), so that the anti-copy film is essentially opaque at a viewing angle approximately perpendicular to the surfaces of the film(s) or layer(s) (S) and is essentially transparent at an oblique viewing angle to the two surfaces of the film(s) or layer(s) (S), wherein each opaque area is formed from at least a first opaque screen (A1) on one of the surfaces of the film(s) or layer(s) (S) and at least a second opaque screen (A2) on at least one of the two surfaces of the film(s) or layer(s) (S), wherein the at least first and second screens (A1 and A2) are arranged essentially horizontally, wherein, for an overall thickness of the film(s) or layer(s) (S) of from 5 to 100 μm and an effective optical aperture angle of a copying apparatus of from 12° to 108°, the widths (dg) of the screens (A1, A2) are in the range from 1.75 to 180 μm, and the widths (do) of the gaps (L) between the screens (A1, A2) are in the range from 1.0 to 165 μm, and wherein the at least first and second screens have approximately the same width (dg) and are arranged over the gaps (L) having a width (do) in an overlapping manner.

2. An anti-copy film as claimed in claim 1, wherein the widths (do) of the gaps (L) between the first and second screens (A1, A2) are from 50% to 90% of the widths (dg) of the screens (A1, A2).

3. An anti-copy film as claimed in claim 1, wherein the angle between the straight lines connecting the two ends of each of the widths (dg) of the first screen and the second screen (A1, A2) lying one on top of the other is in the range from about 30° to about 73°.

4. An anti-copy film as claimed in claim 1, wherein at least three (S1, S2, S3) individual films or layers are transparently bonded by a transparent adhesive to one another so that the third individual film or layer has approximately the same optical dimensions as the other two individual films or layers and is positioned with respect to the other two individual films or layers so that the opaque screens of all three individual films or layers provide for the same oblique viewing angle for the two surfaces of the films or layers.

5. An anti-copy film as claimed in claim 1 wherein the at least one film or one layer (S) has been bonded by a transparent adhesive to a transparent base film (F).

6. An anti-copy film as claimed in claim 5, wherein the thickness of the base film (F) is at least 70% of the thickness (s) of the film(s) or layer(s) (S).

7. An anti-copy film as claimed in claim 5, wherein the thickness (s) of the film(s) or layer(s) (S) corresponds approximately to the thickness (h) of the base film (F).

8. An anti-copy film as claimed in claim 1, wherein the at least partially opaque screens (A1, A2) have a striped form (ST) and are arranged approximately parallel to and at equal distances from one another.

9. An anti-copy film as claimed in claim 1, wherein a first photosensitive coating (B) has been applied to one side of a transparent film (S), exposed directly and developed, producing the first screens (A1), and wherein a second photosensitive coating (B2) has then been applied to the other side of the transparent film (S), exposed indirectly through the first developed photosensitive coating (B) and the film (S), and developed, producing the second screens (A2), said first and second screens being arranged offset to one another and overlapping each other.

10. An anti-copy film as claimed in claim 1, wherein line-comprising first screens (A1) have been applied to one side and a photosensitive coating (B) to the other side of a transparent film or layer (S), and the photosensitive coating (B) has been exposed through the line-comprising first screens and then developed, producing the second screen (A2).

11. An anti-copy film as claimed in claim 10, wherein the exposure has been carried out by means of divergent light radiation, as to provide said overlapping of the first and second screens (A1, A2).

12. An anti-copy film as claimed in claim 1, wherein a negative resist coating (BN) has been applied to one side and a positive resist coating (BP) to the other side of a transparent film (S), and the first and second screens are formed by exposure of the two coatings through a mask (M) from the negative resist coating (BN) side and by washing out the two coatings (BN, BP), said first and second screens being arranged offset to one another and overlapping each other.

13. A process for the production of an anti-copy film or anti-copy layer, as claimed in claim 1, in which screens (A1; A2) which are at least partly opaque are produced on both sides of at least one transparent film or at least one transparent layer (S) with a defined offset to one another, which comprises producing the screens (A1, A2) in the defined offset arrangements on the film or layer (S) by applying a photosensitive coating (B1) to one side of the film or layer (S), exposing the coating through a mask (M1) and subsequently developing the exposed coating, and applying a further photosensitive coating (B2) to the other side of the film (S), exposing the coating through a mask (M2) and subsequently developing the exposed coating.

14. A process as claimed in claim 13, wherein the further photosensitive coating (B2) is exposed through the first, already developed coating (B1).

15. A process as claimed in claim 13, wherein line strip comprising first screens are applied to one side and a photosensitive coating (B) to the other side of a transparent film or layer (S), and the photosensitive coating (B) is exposed through the line or strip comprising first screens and then developed.

16. A process as claimed in claim 13, wherein the exposure is carried out by means of divergent light radiation so as to provide for said overlapping of the first and second screens (A1, A2).

17. A process as claimed in claim 13, wherein a negative resist coating (BN) is applied to one side and a positive resist coating (BP) to the other side of a transparent film or layer (S), and the screens (A1, A2) are formed by exposure of the two coatings through a mask (M) from the negative resist coating (BN) side and by washing out the two coatings (BN, BP).

18. A process as claimed in claim 13, wherein the photosensitive coating material is a plastic coating containing photoinitiators.

19. A process as claimed in claim 13 wherein the photosensitive coating material is rendered opaque before application and exposure thereof by admixing a colorant.

20. A process as claimed in claim 13, wherein the photosensitive coating material is provided with opaque material, at the raised or indented areas after application, exposure and development.

21. A process as claimed in claim 13, wherein the finished coatings containing the screens are sealed by means of a transparent coat of lacquer.

22. An anti-copy film or layer (S) for documents which prevents copying the documents in a copying apparatus with a given effective optical aperture angle, comprising:

at least one film or at least one layer of transparent material having two surfaces and a multiplicity of at least partially opaque areas, wherein the opaque areas are formed as opaque screens and arranged at distances from one another and in a position relative to the surfaces of the film(s) or layer(s) (S), so that the anti-copy film is essentially opaque and a viewing angle approximately perpendicular to the surfaces of the film(s) or layer(s) (S) and is essentially transparent at an oblique viewing angle to the two surfaces of the film(s) or layer(s) (S), wherein each opaque area is formed from at least a first opaque screen (A1) on one of the two surfaces of the film(s) or layer(s) (S) and at least a second opaque screen (A2) on a least one of the two surfaces of the film(s) of layer(s) (S), wherein the at least first and second screens (A1 and A2) are arranged essentially horizontally, wherein said first and second screens (A1,A2) which are at least partly opaque are positioned on both sides of at least one transparent film or at least one transparent layer (S) with a defined offset to one another, and consist of a photosensitive coating (B1) on one side of the film (S), said coating being exposed through a mask (M1) and subsequently developed, and of a further photosensitive coating (B2) on the other side of the film (S), with said further coating also exposed through a mask (M2) and subsequently developed.

23. An anti-copy film as claimed in claim 22, wherein said first photosensitive coating consisting of a negative resist coating (BN) on one side and said further photosensitive coating on the other side of the film consists of a positive resist coating (BP).

24. An anti-copy film as claimed in claim 22, wherein the photosensitive coating material is a plastic coating containing photoinitiators.

25. An anti-copy film as claimed in claim 22, wherein the first and second screens are of a thickness from about 0.1 to about 10 μm, in particular about 1 μm.

26. An anti-copy film as claimed in claim 22, wherein for an oblique viewing angel of 30° the width (dg) of the first and second screens (A1, A2) are in the range from 8.75 μm to 180 μm.

27. An anti-copy film as claimed in claim 22, wherein for an oblique viewing angle of 73° the width (dg) of the first and second screens (A1, A2) are in the range from 1.75 to 40 μm.

* * * * *